US012093566B2

(12) United States Patent
Del Gatto et al.

(10) Patent No.: US 12,093,566 B2
(45) Date of Patent: Sep. 17, 2024

(54) MEMORY CONTROLLER FOR MANAGING RAID INFORMATION

(71) Applicant: Micron Technology, Inc., Boise, ID (US)

(72) Inventors: Nicola Del Gatto, Cassina de' Pecchi (IT); Emanuele Confalonieri, Segrate (IT); Paolo Amato, Treviglio (IT); Patrick Estep, Rowlett, TX (US); Stephen S. Pawlowski, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 117 days.

(21) Appl. No.: 17/684,129

(22) Filed: Mar. 1, 2022

(65) Prior Publication Data

US 2023/0280940 A1    Sep. 7, 2023

(51) Int. Cl.
*G06F 3/06* (2006.01)
*G06F 12/0864* (2016.01)

(52) U.S. Cl.
CPC .......... *G06F 3/0659* (2013.01); *G06F 3/0619* (2013.01); *G06F 3/0622* (2013.01); *G06F 3/0656* (2013.01); *G06F 3/0689* (2013.01); *G06F 12/0864* (2013.01)

(58) Field of Classification Search
CPC .. G06F 12/0864; G06F 3/0659; G06F 3/0619; G06F 3/0622; G06F 3/0656; G06F 3/0689
See application file for complete search history.

(56) References Cited

U.S. PATENT DOCUMENTS

| | | | | |
|---|---|---|---|---|
| 5,732,408 A | * | 3/1998 | Takahashi | G06F 11/1435 711/E12.019 |
| 7,934,054 B1 | * | 4/2011 | Moll | G06F 1/3225 345/541 |
| 8,468,417 B2 | | 6/2013 | Asnaashari et al. | |
| 11,544,194 B1 | * | 1/2023 | Calciu | G06F 12/1009 |
| 2006/0293831 A1 | * | 12/2006 | Yano | G05B 23/0235 701/114 |
| 2011/0022801 A1 | * | 1/2011 | Flynn | G06F 11/108 711/120 |
| 2012/0079174 A1 | * | 3/2012 | Nellans | G11C 11/40615 711/E12.008 |
| 2013/0205065 A1 | * | 8/2013 | Kloeppner | G11C 5/144 711/E12.008 |

(Continued)

*Primary Examiner* — Nanci N Wong
(74) *Attorney, Agent, or Firm* — Brooks, Cameron & Huebsch, PLLC

(57) ABSTRACT

A memory controller can include a front end portion configured to interface with a host, a central controller portion configured to manage data, a back end portion configured to interface with memory devices. The memory controller can include interface management circuitry coupled to a cache and a memory device. The memory controller can receive, by the interface management controller, a first signal indicative of data associated with a memory access request from a host. The memory controller can transmit a second signal indicative of the data to cache the data in a first location in the cache. The memory controller can transmit a third signal indicative of the data to cache the data in a second location in the cache.

20 Claims, 6 Drawing Sheets

(56) References Cited

U.S. PATENT DOCUMENTS

| | | | |
|---|---|---|---|
| 2014/0297963 A1* | 10/2014 | Fukuda | G06F 12/0808 |
| | | | 711/135 |
| 2017/0308309 A1* | 10/2017 | Cordero | G11C 5/04 |
| 2018/0063512 A1* | 3/2018 | Hong | H04N 13/261 |
| 2021/0034531 A1* | 2/2021 | Wallach | G06F 9/30098 |
| 2021/0157521 A1* | 5/2021 | Roy | G06F 3/067 |
| 2021/0286752 A1 | 9/2021 | Modukuri et al. | |
| 2021/0397383 A1* | 12/2021 | Parker | G06F 3/0679 |
| 2022/0107757 A1* | 4/2022 | Byun | G06F 3/0679 |
| 2022/0137865 A1* | 5/2022 | Lee | G06F 13/1663 |
| | | | 711/154 |
| 2022/0317920 A1* | 10/2022 | Park | G06F 3/0604 |
| 2022/0342591 A1* | 10/2022 | Xu | G06F 3/0604 |
| 2022/0342758 A1* | 10/2022 | Tal | G06F 11/1092 |
| 2022/0405009 A1* | 12/2022 | Lee | G06F 12/0802 |
| 2023/0023256 A1* | 1/2023 | Calciu | G06F 12/0824 |

* cited by examiner

MEMORY CONTROLLER FOR MANAGING RAID INFORMATION

TECHNICAL FIELD

The present disclosure relates generally to semiconductor memory and methods, and more particularly, to apparatuses, systems, and methods for a memory controller for managing RAID information.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
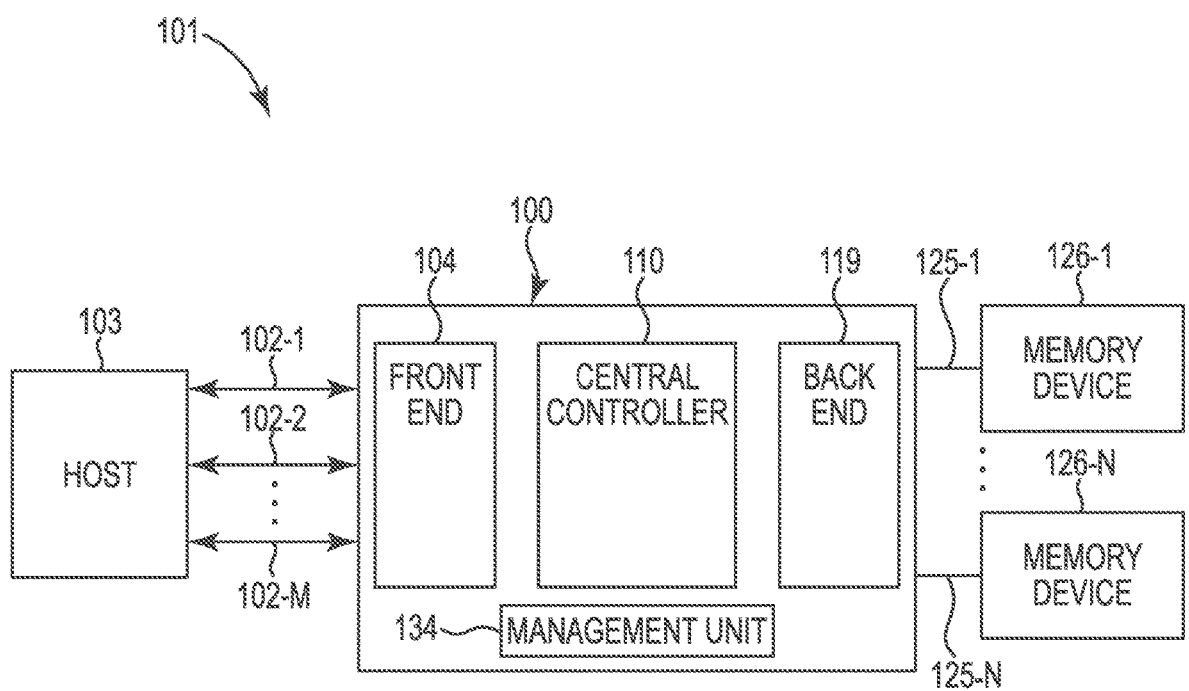
FIG. 1 is a functional block diagram of a computing system including a memory controller in accordance with a number of embodiments of the present disclosure.

Memory controllers for managing RAID information in memory systems are described. The memory controller can include a front end portion configured to interface with a host, a central controller portion configured to manage data, a back end portion configured to interface with memory devices, and a management unit.

The memory controller can be included in a memory system. In some embodiments, the memory system can be a compute express link (CXL) compliant memory system. The host interface can be managed with CXL protocols and be coupled to the host via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium. The signal can correspond to a command (e.g., a read command, a write command, etc.).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port. In at least one embodiment, the interface between the memory controller 100 and the host 103 can be a PCIe physical and electrical interface operated according to a CXL protocol.

The central controller portion 110 can include and/or be referred to as data management circuitry. The central controller portion 110 can control, in response to receiving a request from the host 103, performance of a memory operation. Examples of the memory operation include memory access request such as a read operation to read data from a memory device 126 or a write operation to write data to a memory device 126.

The central controller portion 110 can generate error detection information and/or error correction information based on data received from the host 103. The central controller portion 110 can perform error detection operations and/or error correction operations on data received from the host 103 or from the memory devices 126.

An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

An example of an error correction operation is an error correction code (ECC) operation. ECC encoding refers to encoding data by adding redundant bits to the data. ECC decoding refers to examining the ECC encoded data to check for any errors in the data. In general, the ECC can not only detect the error but also can correct a subset of the errors it is able to detect.

The central controller portion 110 can generate redundant array of independent disks (RAID) information. With respect to solid state memory, RAID refers to distributed data storage across multiple banks of a physical memory device, where the distribution serves to achieve one or more of reliability, availability, performance, and capacity.

RAID circuitry, as detailed herein, can be included in the central controller portion 110 and can generate and/or utilize the RAID information. For instance, the RAID circuitry can utilize the RAID information to provide one or more of data mirroring, data parity, striping, and combinations thereof depending on the particular implementation. The RAID circuitry can operate on data in conjunction with the error detection circuitry to provide check-and-recover correction. More specifically, the error detection circuitry can detect an error in data and the RAID circuitry can recover correct data in response. In at least one embodiment, the check-and-recover correction provided by the error detection circuitry and the RAID circuitry is supplemental to the error correction provided by the error correction circuitry. For example, if data read from the memory devices has an error correctable by the error correction circuitry, it can do so without further data recovery by the RAID circuitry. However, if an error persists that is not correctable by the error correction circuitry, then the data may be recoverable by the RAID circuitry. As another example, an error may escape detection by the error correction circuitry, but be detected by the error detection circuitry. In such an example, the underlying data may be recoverable by the RAID circuitry.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include a sixteen pin data bus and a two pin data mask inversion (DMI) bus, among other possible buses. The back end portion 119 can exchange (e.g., transmit or receive) data with the memory devices 126 via the data pins and exchange error detection information, RAID information, and/or error correction information with the memory devices 126 via the DMI pins. The error detection information, RAID information, and/or error correction information can be exchanged contemporaneously with the exchange of data.

An example of the memory devices 126 is dynamic random access memory (DRAM) operated according to a protocol such as double-data rate (DDR) based memory. An example of a DDR based memory is a low-power double data rate (LPDDRx), which may be referred to herein as LPDDRx DRAM devices, LPDDRx memory, etc. The "x" in LPDDRx refers to any of a number of generations of the protocol (e.g., LPDDR5).

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
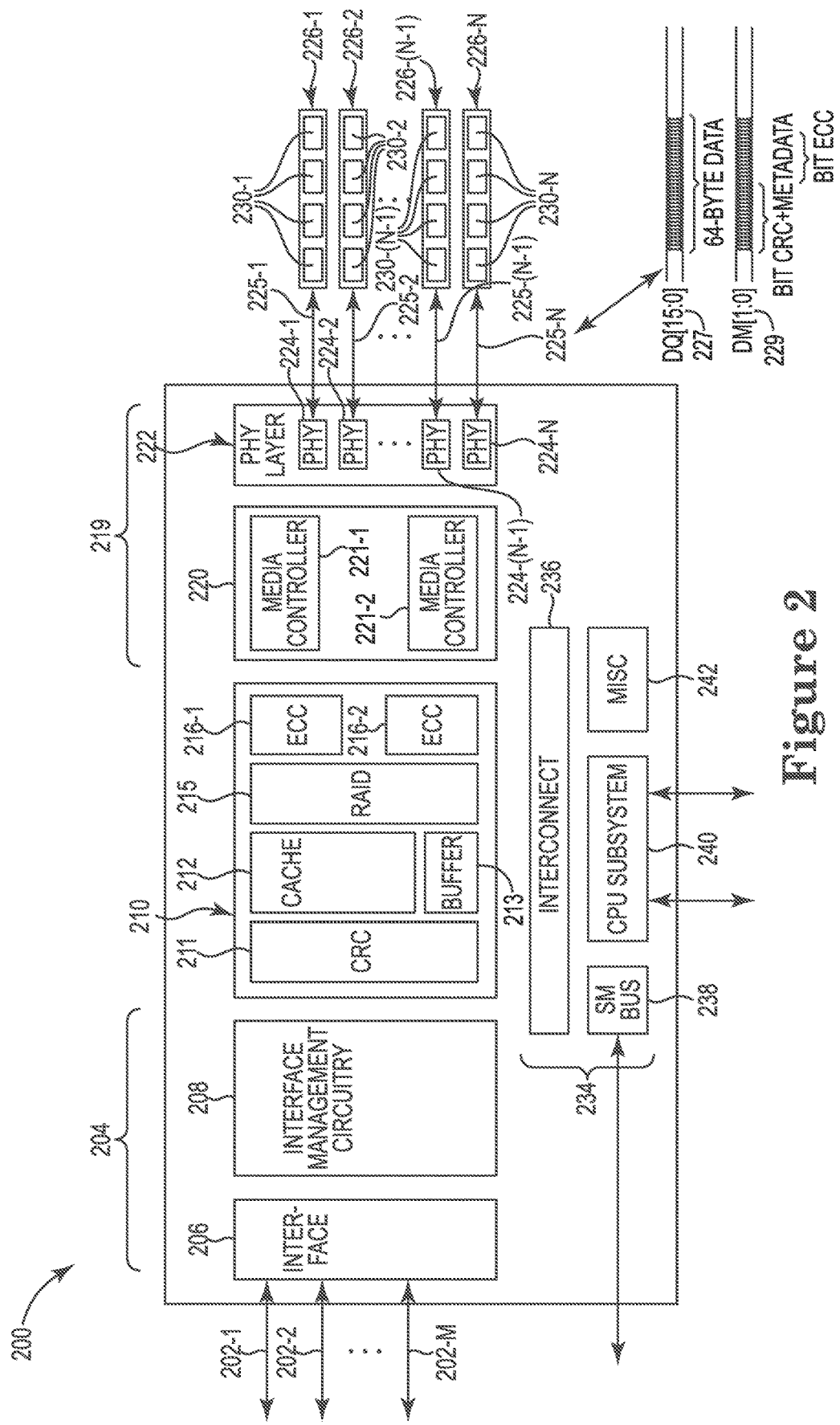
FIG. 2 is a functional block diagram of a memory controller having a first configuration in accordance with a number of embodiments of the present disclosure.

FIG. 2 is a functional block diagram of a memory controller 200 having a first configuration in accordance with a number of embodiments of the present disclosure. As shown in FIG. 2, a front end portion 204 can include an interface 206, which includes multiple I/O lanes 202-1, 202-2, . . . , 202-M, as well as interface management circuitry 208 to manage the interface 206. An example of the interface 206 is a peripheral component interconnect express (PCIe) 5.0 interface. In some embodiments, the memory controller 200 can receive access requests involving at least one of the cache memory 212 and the memory devices (e.g., die) 226-1, 226-2, . . . , 226-(N−1), 226-N via the interface 206 according to a CXL protocol. The interface 206 can receive data (e.g., a first signal indicative of data associated with a memory access request) from a host (e.g., the host 103 shown in FIG. 1) through the I/O lanes 202. The interface management circuitry 208 may use CXL protocols to manage the interface 206 and may be referred to as CXL interface management circuitry 208. The CXL interface management circuitry 208 can be coupled to a host via the PCIe interface 206.

Data management circuitry 210 can be coupled to the interface management circuitry 208. The data management circuitry 210 can be configured to cause performance of a memory operation. The data management circuitry 210 can include at least one of error detection circuitry 211 (e.g., "CRC circuitry") and error correction circuitry 216. The error detection circuitry 211 can be configured to perform error detection operations on data. For example, the error detection circuitry 211 can be configured to generate a check value resulting from an algebraic calculation on data received from the interface management circuitry 208 and to transmit the check value to at least one of the cache memory 212, buffer 213, and media control circuitry 220. The check value can be referred to as CRC data or error detection data.

In at least one embodiment, the error detection circuitry is configured to perform an error detection operation on data received from the interface management circuitry prior to the data being cached and/or operated on by the error correction circuitry 216. Another example of an error detection operation is to generate a check value resulting from an algebraic calculation on data received from the media control circuitry and a comparison of that check value with a check value received from the media control circuitry 220 to determine whether the data includes an error (e.g., if the two check values are not equal).

The data management circuitry 210 can include a cache memory (cache) 212 to store data, error detection information, error correction information, RAID information and/or metadata associated with performance of the memory operation. An example of the cache memory 212 is a thirty two (32) way set-associative cache memory including multiple cache lines. The cache line size can be equal to or greater than the memory controller 200 access granularity (e.g., 64 bytes for a CXL protocol). For example, each cache line can include 256 bytes of data. In another example, each cache line can include 512 bytes of data. Read and write requests of CXL memory systems can be 64 bytes in size. Therefore, data entries in the cache memory 212 can have 64 bytes of data. Each cache line can comprise 256 bytes. Therefore, multiple 64 byte requests can be stored in each cache line. In response to a request from the host, the memory controller 200 can write 256 bytes of data to a memory device 226. In some embodiments, the 256 bytes of data can be written in 64 byte chunks. Use of the cache memory 212 to store data associated with a read operation or a write operation can increase a speed and/or efficiency of accessing the data because the cache memory 212 can prefetch the data and store the data in multiple 64 byte blocks in the case of a cache miss. Instead of searching a separate memory device, the data can be read from the cache memory 212. Less time and energy may be used accessing the prefetched data than would be used if the memory system has to search for the data before accessing the data.

However, cached data and memory device data (e.g., stored in memory devices 226) may differ over time. For instance, cached data and memory device data may differ depending on a type of cache writing policy employed. For instance, a controller, as detailed herein, can be configured to manage a cache in accordance with a write-back cache writing policy. Using a write-back cache writing policy may result in cached data (e.g., as identified by a dirty bit) being different than memory device data.

A cache write-back can be performed in accordance with a write-back cache writing policy to reconcile the cached data with the memory device data. Yet, performance of the cache write-back while generally effective for resolving any difference between the cached data and memory device data, may result in a decrease performance. The loss in performance can at least in part be attributable to a quantity of memory operations and/or an amount of data associated with performance of the cache write-back.

For instance, a RAID scheme may be implemented with the RAID circuitry 215 to permit data recovery of the damaged chip by reading all of the constituent chips of the memory system. Approaches employing the RAID scheme may store data and corresponding parity data on the memory devices 226. As a result, approaches employing a RAID scheme may result in both the data and corresponding parity data being fetched from a memory device 226 in the event of the cache write-back. For example, both "old" data and corresponding "old" parity data may be fetched from a memory device 226 in the event of the cache-write back to permit "updated" user data and/or the corresponding "updated" parity data to be written to the memory device 226.

Consequently, such approaches can lead to write amplification, where for one host write operation causes at least two memory device read operations (one for the "old" user data to be updated and one for the corresponding parity "old" data) and at least two memory device write operations (one for the "updated" user data and one for the corresponding "updated" parity data) causing a write amplification factor of at least 4. That is, such approaches can degrade performance of a memory sub-system at least during fetching of the "old" user data and the corresponding "old" parity data from the memory device. Degradation of performance can be undesirable, especially in critical applications and/or in demanding applications in which very high memory performance.

Aspects of the present disclosure address the above and other deficiencies by fetching the "old" parity data from a memory device (e.g., a memory device of the memory devices 226) in the absence of fetching the "old" data from the memory device, as detailed herein. Thus, any write amplification and corresponding performance degradation can be reduced (e.g., reduced by 25%), in contrast to other approaches that fetch both the "old" user data and the corresponding "old" parity data from a memory device such as the memory device 226.

The data management circuitry 210 can include a buffer 213 to store data, error detection information, error correction information, RAID information, and/or metadata subject to an operation thereon by another component of the data management circuitry 210 (e.g., the error detection circuitry 211, the error correction circuitry 216, and the RAID circuitry 215). The buffer 213 can allow for the temporary storage of information, for example, while another component of the data management circuitry 210 is busy. In some embodiments, the cache memory 212 can be used to temporarily store data and the buffer 213 can be used to temporarily store other information associated with the data, such as error detection information, error correction information, RAID information, and/or metadata.

As shown in FIG. 2, the data management circuitry 210 can include error correction circuitry 216-1, 216-2 configured to perform error correction operations on the data (e.g., ECC encode the data and/or ECC decode the data), and RAID circuitry 215 configured to perform RAID operations on the data. The error correction circuitry 216 can be coupled to any of the cache 212, buffer 213, and/or RAID circuitry 215.

Figure 3:
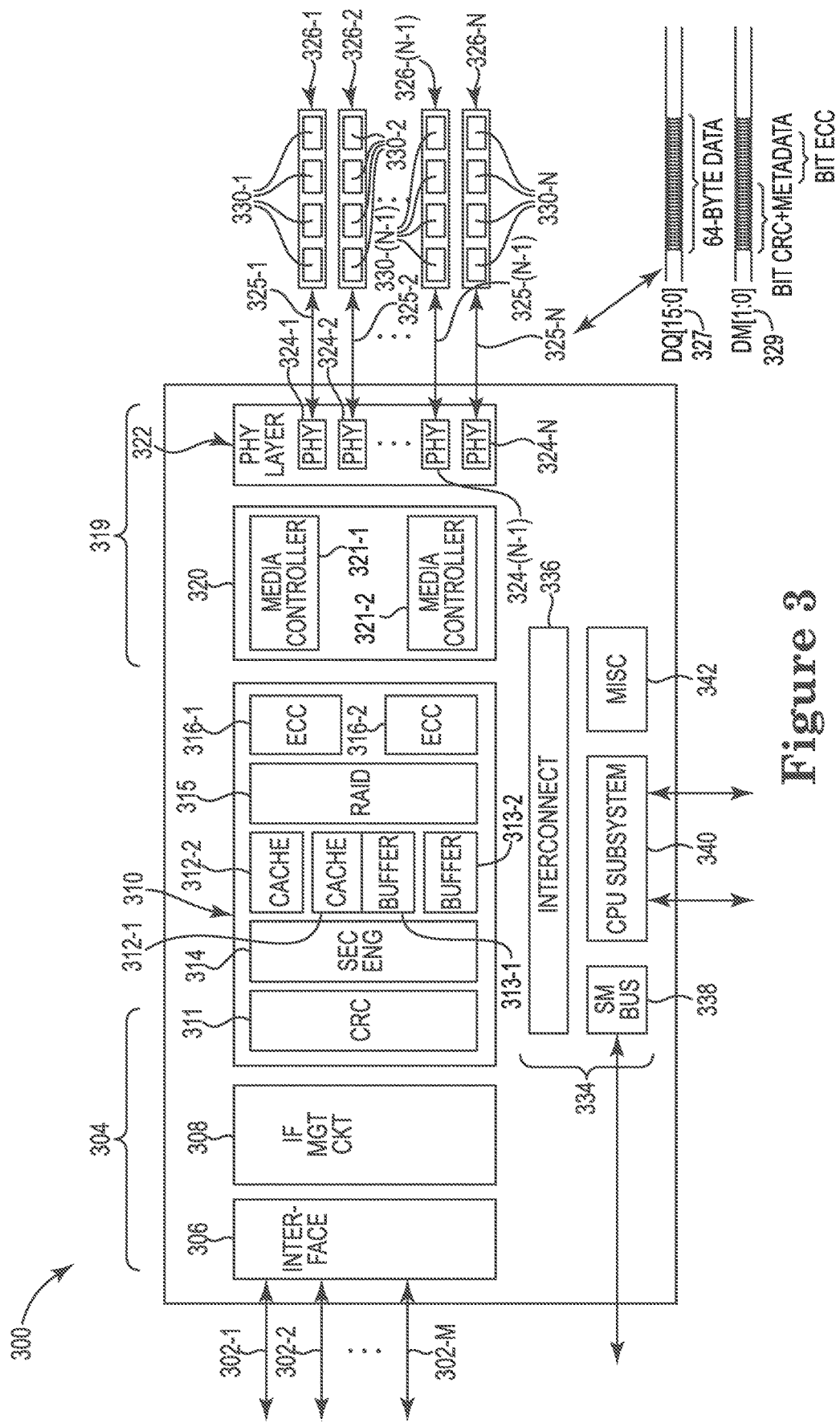
FIG. 3 is a functional block diagram of a memory controller having a second configuration in accordance with a number of embodiments of the present disclosure.

Although an individual (i.e., a single) cache 212 is illustrated, embodiments are not so limited. Embodiments can include only one cache 212 (as illustrated in FIG. 2) or a plurality of caches (e.g., two caches as illustrated in FIG. 3 in the data management circuitry 210. Similarly, although two error correction circuits 216 are illustrated, embodiments are not so limited. Embodiments can include only one error correction circuit 216 or more than two error correction circuits 216 in the data management circuitry 210. In at least one embodiment, the memory controller 200 can include an equal quantity of error correction circuits 216-1, 216-2 as media controllers 221-1, 221-2. In at least one embodiment, the data can be protected by the error detection circuitry 211, the RAID circuitry 215, and/or the error correction circuitry 216 before being written to the memory devices 226.

The data management circuitry 210 can include the cache memory 212 and the buffer 213 coupled between the interface management circuitry 208 and the RAID circuitry 215 and/or the error correction circuitry 216. More specifically, the cache memory 212 and the buffer 213 can be coupled between the interface management circuitry 208 and RAID circuitry 215. A quantity of error detection circuits and/or and a quantity of error correction circuits can be equal to the quantity of PHY memory interfaces 224-1, 224-2, . . . , 225-(N−1), 225-N. In such embodiments, there is a 1:1:1 correlation between the error correction circuits, the error detection circuits, and the memory devices. Though other configurations such as the configuration illustrated in FIG. 2 are possible.

As shown in FIG. 2, the memory controller 200 can include a back end portion 219 including a media control circuitry 220 coupled to the data management circuitry 210. The media control circuitry 220 can include media controllers 221-1, 221-2. The back end portion 219 can include a physical (PHY) layer 222 having PHY memory interfaces 224-1, 224-2, . . . , 224-(N−1), 224-N. Each physical interface 224 is configured to be coupled to a respective memory device 226.

The PHY layer 222 can be an LPDDRx memory interface. Each of the PHY memory interfaces 224 can include respective data pins 227 and DMI pins 229. For example, each PHY memory interface 224 can include sixteen data pins 227 "[15:0]" and two DMI pins 229 "[1:0]". The media control circuitry 220 can be configured to exchange data with a respective memory device 226 via the data pins 227. The media control circuitry 220 can be configured to exchange error correction information, error detection information, RAID information, and/or metadata via the DMI pins 229 as opposed to exchanging such information via the data pins 227. The DMI pins 229 can serve multiple functions, such as data mask, data bus inversion, and parity for read operations by setting a mode register. The DMI bus uses a bidirectional signal. In some instances, each transferred byte of data has a corresponding signal sent via the DMI pins 229 for selection of the data. In at least one embodiment, the data can be exchanged contemporaneously with the error correction information, RAID information, and/or the error detection information. For example, a given quantity of data such as 64 bytes of data can be exchanged (transmitted or received) via the data pins 227 while a given quantity of bits of error detection information (and metadata) and/or bits of error correction information are exchanged via the DMI pins 229. Such embodiments reduce what would otherwise be overhead on the DQ bus for transferring error correction information, error detection information, RAID information and/or metadata.

The back end portion 219 can couple the PHY layer portion 222 to memory banks 230-1, 230-2, . . . , 230-(N−1), 230-N of memory devices 226-1, 226-2, . . . , 226-(N−1), 226-N. The memory devices 226 each include at least one array of memory cells. In some embodiments, the memory devices 226 can be different types of memory. The media control circuitry 220 can be configured to control at least two different types of memory. For example, the memory devices 226-1, 226-2 can be DDR based memory such as LPDDRx memory, among other types of DDR based memory operated according to a first protocol and the memory devices 226-(N−1), 226-N can be DDR based memory such as LPDDRx memory, among other types of DDR memory operated according to a second protocol different from the first protocol. In such an example, the first media controller 221-1 can be configured to control a first subset of the memory devices 226-1, 226-2 according to the first protocol and the second media controller 221-2 can be configured to control a second subset of the memory devices 226-(N−1), 226-N according to the second protocol. In a specific example, the memory devices 226-1, 226-2 may have on board error correction circuitry. Although not specifically illustrated, for some embodiments, the media controller circuitry 220 can include a single media controller 221.

As detailed, herein in some instances, the data management circuitry 210 such as the RAID circuitry 215 can receive or transmit as signal (e.g., a second signal) to cache data in a first location in the cache and can receive or transit a signal (e.g., a third signal) to cache the data in a second location in the cache. For instance, the data in the second location of the cache can be an identical copy of the data cached in the first location of the cache to promote various aspects herein.

As detailed herein, in some examples the data can be cached in the first location in the cache substantially contemporaneously with caching the data in the second location in the cache. As used herein, the term "substantially" means that the characteristic need not be absolute, but is close enough so as to achieve the advantages of the characteristic. For example, "substantially contemporaneously" is not limited to operations that are performed absolutely contemporaneously and can include timings that are intended to be contemporaneous but due to manufacturing limitations may not be precisely contemporaneously. For example, due to read/write delays that ma-y be exhibited by various interfaces (e.g., LPDDR5 vs. PCIe), media controllers and/or other components such as the RAID controller 215 that are utilized "substantially contemporaneously" may not start or finish at exactly the same time. For example, the memory controllers can be utilized such that they are writing data to the memory devices at the same time regardless of whether one of the media controllers commences or terminates prior to the other.

The memory controller 200 can include a management unit 234 configured to initialize, configure, and/or monitor characteristics of the memory controller 200. In some embodiments, the management unit 234 includes a system management (SM) bus 238. The SM bus 238 can manage out-of-band data and/or commands. The SM bus 238 can be part of a serial presence detect. In some embodiments, the SM bus 238 can be a single-ended simple two-wire bus for the purpose of lightweight communication. The management unit 234 can include a CPU subsystem 240, which can function as a controller for the management unit to execute instructions associated with initializing, configuring, and/or monitoring the characteristics of the memory controller 200.

The management unit 234 can include miscellaneous circuitry 242, such as local memory to store codes and/or data associated with managing and/or monitoring the characteristics of the memory controller 200. An endpoint of the management unit 234 can be exposed to the host system (e.g., the host 103 shown in FIG. 1) to manage data. In some embodiments, the characteristics monitored by the management unit 234 can include a voltage supplied to the memory controller 200 and/or a temperature measured by an external sensor. The management unit 234 can include an interconnect 236, such as an advanced high-performance bus (AHB) to couple different components of the management unit 234.

The management unit 234 can include circuitry to manage in-band data (e.g., data that is transferred through the main transmission medium within a network, such as a local area network (LAN)). In some embodiments, the CPU subsystem 240 can be a controller that meets the Joint Test Action Group (JTAG) standard and operate according to an Inter-Integrate Circuit ($I^2C$ or $I^3C$) protocol, and auxiliary I/O circuitry. JTAG generally refers to an industry standard for verifying designs and testing printed circuitry boards after manufacture. $I^2C$ generally refers to a serial protocol for a two-wire interface to connect low-speed devices like microcontrollers, I/O interfaces, and other similar peripherals in embedded systems. In some embodiments, the auxiliary I/O circuitry can couple the management unit 234 to the memory controller 200. Further, firmware for operating the management unit can be stored in the miscellaneous circuitry 242. In some embodiments, the miscellaneous circuitry 242 can be a flash memory such as flash NOR memory or other persistent flash memory device.

FIG. 3 is a functional block diagram of a memory controller 300 having a second configuration in accordance with a number of embodiments of the present disclosure. FIG. 3 is analogous to FIG. 2, except that it includes an additional cache in the form of a first cache 312-1 and the second cache 312-2 and additional circuitry in the form of a security engine 314 in the data management circuitry 310.

The security engine 314 can also be referred to as encryption circuitry 314. The encryption circuitry 314 can be coupled between the error detection circuitry 311 and RAID circuitry 315. The encryption circuitry 314 can be configured to encrypt data before storing the data in memory devices 326 or cache memory 312 and/or decrypt data after reading the encrypted data from the memory devices 326 or the cache memory 312. An example of the encryption circuitry 314 is advanced encryption standard (AES) circuitry. However, in some embodiments the memory controller 300 can be provided without inclusion of the encryption circuitry (e.g., similar to FIG. 2).

The memory controller 300 can include a front end portion 304, data management circuitry 310, and a back end portion 319. The front end portion 304 can include an interface 306, with multiple I/O lanes 302-1, 302-2, . . . , 302-M, as well as interface management circuitry 308 to manage the interface 306.

The data management circuitry 310 can include the cache memory (cache) 312 in the form of a first cache 312-1 and a second cache 312-2 and the buffer 313 in the form of a first buffer 313-1 and a second buffer 313-2 coupled between the error detection circuitry 311 and the RAID circuitry 315 and/or the error correction circuitry 316-1, 316-2. In some embodiments, the first cache 312-1 can be the same type of cache as the second cache 312-2. For instance, in some embodiments the first cache 312-1 and the second cache 312-2 are each set associative caches such as a thirty two (32) way set-associative cache memory including multiple cache lines. The cache line size of the first cache 312-1 and the cache line size of the second cache 312-2 can be equal. The cache line size of the first cache 312-1 and the cache line size of the second cache 312-2 can be equal to or greater than the memory controller 300 access granularity (e.g., 64 bytes for a CXL protocol). As such, a size of each of the cache lines of the plurality of cache lines can be equal or greater than the memory controller access granularity. For example, each cache line can include 256 bytes of data, among other possibilities.

In some embodiments, each of the first cache 312-1 and the second cache 312-2 can be the same size. Having the first cache 312-1 and the second cache 312-2 be the same size can promote aspects herein such as permitting the data stored at the first location in the first cache 312-1 and the second location in the second cache 312-2 be cache at the same respective locations in each of the first cache 312-1 and the second cache 312-2.

In some embodiments, the data can be stored at the first location in the first cache 312-1 that has the same logical address, the same physical address, or both, as a second location at which a copy of the data is stored in the second cache 312-2. For instance, in some embodiments, the first location in the first cache 312-1 can have the same physical address as a corresponding physical address of the second location in the second cache 312-2. A corresponding address refers to the same address (e.g., having the same index/identifier, etc.) as another address such as another address in a different cache. Similarly, in some embodiments, the first location in the first cache 312-1 can have the same logical address as a corresponding logical address of the second location in the second cache 312-2. However, in some embodiments the first cache 312-1 and the second cache 312-2 can be different sizes and/or an offset or other mechanism can be employed to store the data and a copy of the data at different respective locations (e.g., different physical addresses, different logical addresses, or both) in the first cache 312-1 and the second cache 312-2.

The back end portion 319 can include media control circuitry 320 and a PHY layer 322. The media control circuitry 320 can include media controllers 321-1, 321-2. The PHY layer 322 can include PHY memory interfaces 324-1, 324-2, . . . , 324-(N−1), 324-N configured to be coupled to memory banks 230-1, 230-2, . . . , 230-(N−1), 230-N of memory devices 326-1, 326-2, . . . , 326-(N−1), 326-N via channels 325-1, 325-2, . . . , 325-(N−1), 325-N. Each of the PHY memory interfaces 324 can include respective data pins 327 and DMI pins 329. The memory controller 300 can include a management unit 334 including an interconnect 336, an SM bus 338, a CPU subsystem 340, and miscellaneous circuitry 342.

In some embodiments, the RAID circuitry 315 and/or the error detection circuitry 311 (independently or collectively) can be a finite state machine configured to manage a check and recovery algorithm during read operations from the memory devices 326. The RAID circuitry 315 can be configured to perform read-modify-write during write operations to the memory devices 326 (e.g., in order to write the data according to the desired RAID algorithm). The error detection circuitry 311 and the RAID circuitry 315 can operate collectively when performing management of data for the desired RAID algorithm (e.g., stripe). In the event of an error that requires RAID-level correction, the RAID circuitry 315 can be activated and operate on the data, potentially with additional accesses of the memory devices 326, to make the necessary corrections.

In some embodiments, the RAID circuitry 315 can implement the desired RAID algorithm individually for each memory device 326. For example, data can be striped across the banks 330 of an individual memory device 326 rather than across multiple memory devices 326. In some embodiments, the RAID circuitry 315 can stripe data across multiple channels 325 to multiple memory devices 326. In such embodiments, the RAID circuitry 315 can drive multiple channels 325 substantially contemporaneously. Each media controller 321 can execute commands independently of the other media controllers 321. This RAID architecture can provide more flexibility to the memory system in regard to how much data is written to a memory device 326 and when the data is written to a memory device 326 in comparison to other approaches (e.g., such as those that employ a low power chip kill (LPCK) architecture. In some instances, check values and parity data would be stored with the data (user data) in the memory device 326 in blocks within a same DRAM row as the user data.

Figure 4:
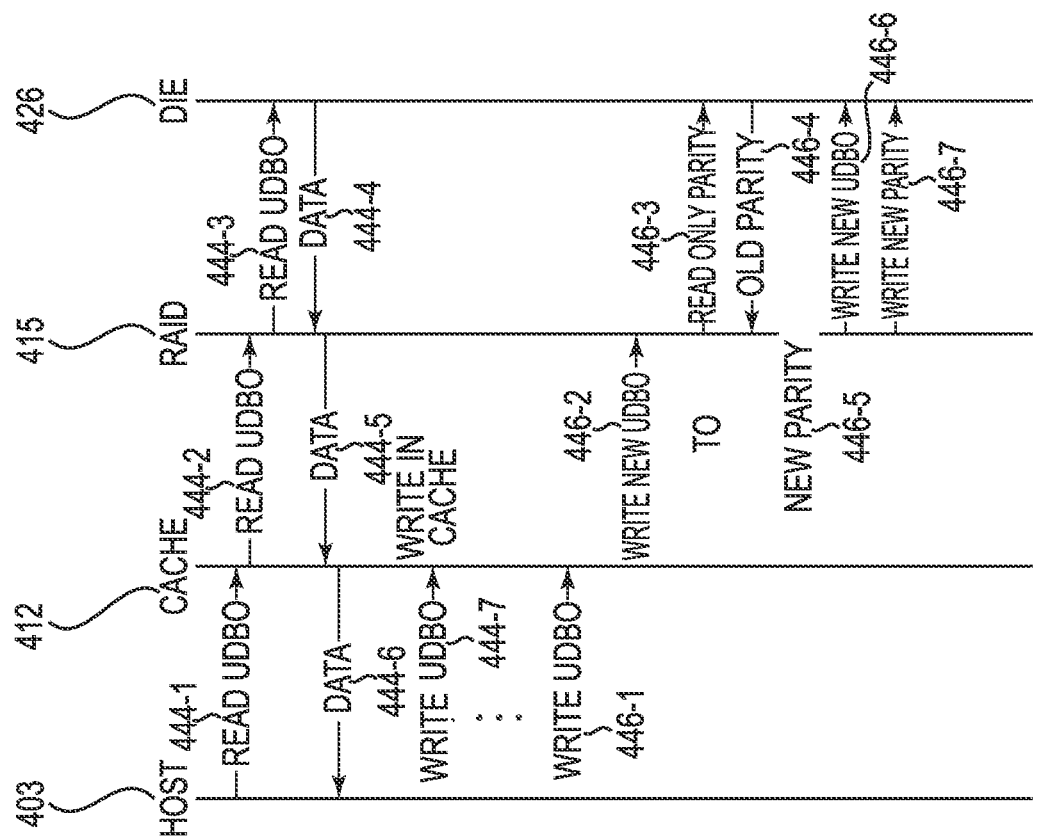
FIG. 4 is a functional flow diagram of a number of embodiments of the present disclosure.

FIG. 4 is a functional flow diagram of a number of embodiments of the present disclosure. As illustrated in FIG. 4, signals can be transmitted between various components such as a host 403, a cache 412, RAID circuitry 415, and a die 426.

For instance, an interface (e.g., interface 206 as illustrated in FIG. 2) can receive data (e.g., receive a first signal indicative of data associated with a memory access request) from the host through the I/O lanes (e.g., I/O lanes 202 as illustrated in FIG. 2). A signal (e.g., the first signal) indicative of the data requested by the host (e.g., responsive to receipt of read commands from the host) can be transmitted to the cache 412, as represented by 441-1. In the event of a cache miss, the data request from the host can be transmitted to the RAID circuitry 415, as represented by 444-2, and/or transmitted to the die 426, as represented by 443-3. In this way, the host can perform a memory access request associated with the cache 412, and in the event of a cache miss with the die 426.

As mentioned, various embodiments herein can relate to a Redundant Array of Independent Disks" (RAID) operation. A RAID operation can involve storing data (e.g., user data or host data) across a plurality of dice (e.g., different channels) as a number of "stripes" along with error recovery data (e.g., parity data) in one or more dedicated chips. As used herein, a stripe can refer to a set of host data and error recovery data that was generated based on the set of host data. Stated differently, a RAID stripe can include various blocks such as a user data block (UDB) and a parity data block (PDB). The size of a UDB and a PDB can be the same or different. For instance, in some embodiments the UDB and the PDB can be the same size (e.g., 64 bytes), among other possibilities. A quantity of stripes (RAID stripes) can be takes across a page of the die 426 and thus promote aspects herein such as permitting a RAID operation utilizing the RAID stripe can be performed. In some embodiments, data in the stripe can be distributed across different channels. Accordingly, reading the data corresponding to the stripe can involve accessing multiple channels.

Data can be fetched from the die 426, and in such instances a signal (e.g., a second signal and a third signal) indicative of the data can be transmitted to cache 412, as represented by 444-4 and 444-5. For instance, in the event of a cache miss involving the cache 412, a signal indicative of data can be transmitted from the die 426 to the host 403 and/or to the cache 412. For example, a second signal indicative of the data can be transmitted from the die 426 to the cache 412 in a first location in the cache 412 and a third signal indicative of the data such as a copy of the data can be transmitted from the die 426 to the second location in the cache 412. As mentioned, such "dual" cache approaches storing the data at a first location and a copy of the data at a second location can be employed with an individual cache or with a plurality of separate and distinct caches (e.g., having respective and distinct cache lines).

In some embodiments, the data cached in the second location of the cache can be an identical copy of the data cached in the first location of the cache. Being identical refers to two instances of a set of data having the same size and containing the same data. For instance, all data in a cache line or all data intended to be included in a cache line can be copied and stored at the second location of the cache as an identical copy.

As represented by 444-6, a signal indicative of the data can be transmitted to the host 403. The host 403 can continue to transmit signals (e.g., a further signal) indicative of memory access requests and can write further data (e.g., updated user data) to the cache 412. For instance, a signal (e.g., a fourth signal, as represented by 444-7) indicative of the additional memory request to write data in the cache 412 can be transmitted in the absence of modification (e.g., absence of emission of a signal intended to modify (erase, write, etc.) the data) of data at the second location in the cache and can occur in the absence of transmission of a signal indicative of the additional memory access request to the die 426. The fourth signal 444-7 can be representative of one or more writes such as those occurring in conjunction with a cache hit and/or writes occurring during a cache filling operation (e.g., when a cache line in the cache 412 is empty/not full). The copy of the data at the second location in the cache 412 can remain unchanged and thereby provide improved RAID information management, as detailed herein, and yet typical caching operations can occur utilizing other cache locations (e.g., another location in the first cache).

The host 403 can continue to transmit signals (e.g., a further signal) indicative of memory access requests and can write further data (e.g., updated user data) to the cache 412, for instance until a cache eviction of the cache 412. A signal, as represented by 446-1 can be transmitted to write data (e.g., updated user data (UDBO)) to the cache 412 and in response a cache eviction can occur. Responsive to occurrence of the cache eviction data can be written from the cache 412 to the RAID circuitry 415, as represented by 446-2. The signal can be indicative of any updated data from the host 403, indicative of updated data corresponding to any modified data in the cache 412, for instance as identified by a "dirty" bit associated with the updated data, and/or indicative of all data in the cache 412.

In addition, a signal, as represented by 446-3, can be transmitted from the RAID circuitry 415 to the die 426 to read parity data ("old" parity data) from the die 426. As mentioned, the signal to read the parity data from the die 426 can be the only signal transmitted to the die 426 as part of a cache write-back. In this way, any write amplification can be mitigated, as detailed herein. Responsive to receipt of the signal 446-3, a signal indicative of the parity data ("old" parity data) can be transmitted from the die 426 to the RAID circuitry 415, as represented by 446-4.

The RAID circuitry and/or other circuitry can perform an operation to determine updated parity data, as represented by 446-5. The updated parity data can be determined based on the "old" parity data, the cached data (e.g., the copy of the data) from the second location in the second cache, and further data (e.g., the updated user data (UDBO). The operation can be a RAID operation. For example, a RAID operation can be performed by XORing the parity data, the cached data, and the further data to determine updated parity data which can permit a recover operation to be performed to recover the further data. In this way, the RAID operation can be performed utilizing the cached data from the cache 412 and thereby avoid any write amplification inherent in other approaches that employ a read/write request to the die 426 to obtain data (e.g., "old" user data).

In some embodiments, a signal can be transmitted to store the further data (the "updated" user data) in the memory device. For instance, the updated data (the "new UDBO") can be written back to the die 426, as identified at 446-6. In some embodiments, a signal indicative of the updated parity data can be transmitted to store the updated (i.e., new) parity data in a memory device such as the die 426, as represented by 446-7.

Figure 5:
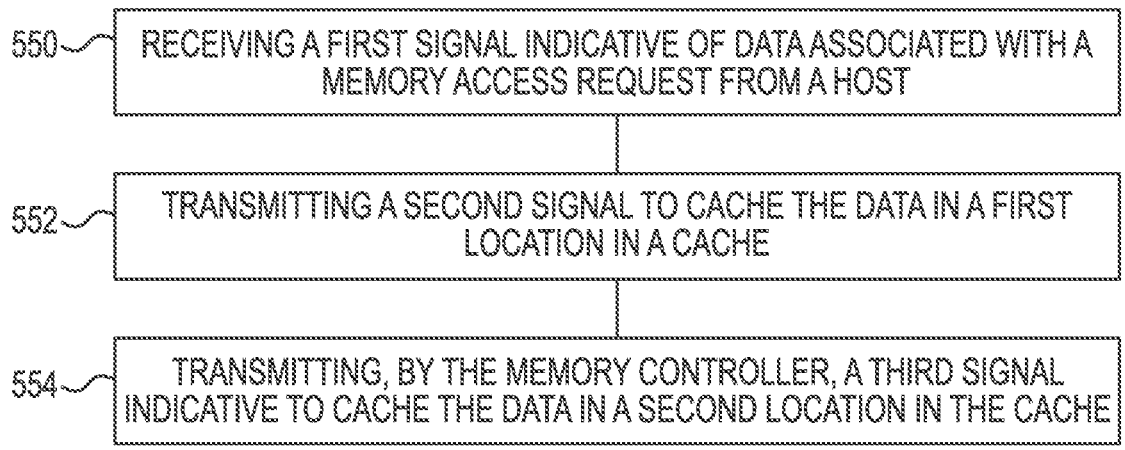
FIG. 5 is a flow diagram of a method for managing RAID information in accordance with a number of embodiments of the present disclosure.

FIG. 5 is a flow diagram of a method for managing RAID information in accordance with a number of embodiments of the present disclosure. The methods described herein (e.g., with respect to FIGS. 5-6) can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 550, the method can include receiving, by an interface management circuitry of a memory controller coupled to a cache and a memory device, a first signal indicative of data associated with a memory access request from a host. For instance, the method can include receiving data from a host by CXL interface management circuitry of a memory controller.

At block 552, the method can include transmitting, by the memory controller, a second signal to cache the data in a first location in the cache. At block 554, the method can include transmitting, by the memory controller, a third signal indicative to cache the data in a second location in the cache. In some embodiments, the data cached in the second location of the cache can be an identical copy of the data cached in the first location of the cache.

In some embodiments, the cache is an individual cache. In some embodiments, the first location can be associated with a first logical portion of the individual cache and the second location can be associated with a second logical portion of the individual cache that is different than the first logical portion. In some embodiments, the cache includes a first cache and a second cache that is physically distinct from the first physical cache. In some embodiments, the first location can be in the first cache and the second location can be the second cache.

In some embodiments, the method can include transmitting a fourth signal indicative of additional data associated with the additional memory access request (e.g., a write request) to cache the additional data in the cache in the absence of modification of the data at the second location in the cache, as detailed herein. In some embodiments, the method can include transmitting a fourth signal indicative of the additional memory access request to read data in the cache in the absence of modification of the data at the second location in the cache, as detailed herein. In some embodiments, the method can include transmitting the fourth signal in the absence of transmission of a signal indicative of the additional memory access request to the memory device.

In some embodiments, the method can include receiving a further signal indicative of further data associated with a further memory access request, transmitting a signal associated with a read operation to read cached data at the second location, transmitting a signal to read parity data stored in the memory device. In some embodiments, the method can include performing an operation to determine updated parity data based on the parity data, the cached data read from the second location in the cache, and the further data. In some embodiments, the method can include transmitting a signal to store the updated parity data in the memory device; and transmitting a signal to store the further data in the memory device. In some embodiments, a RAID recovery operation can be performed on the data by the data management circuitry.

Figure 6:
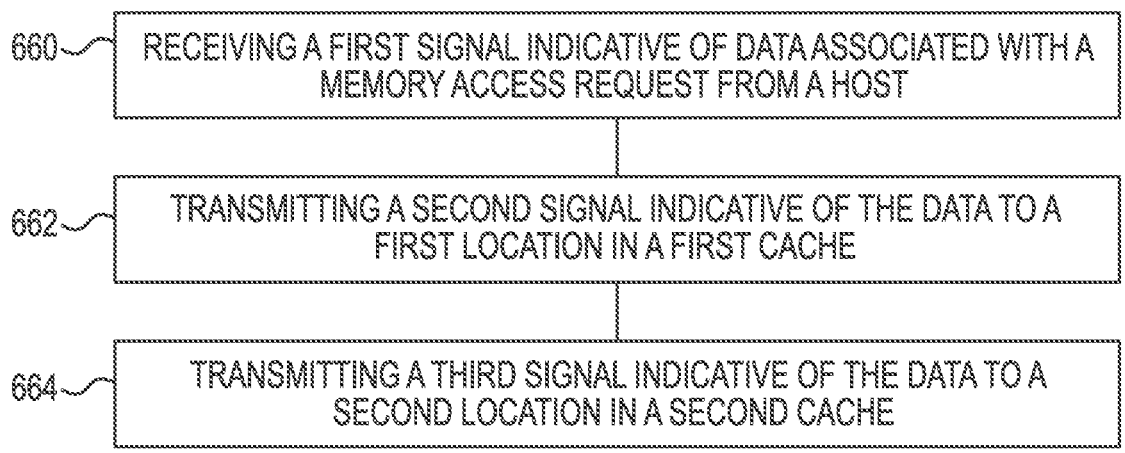
FIG. 6 is a flow diagram of a method for managing RAID information in accordance with a number of embodiments of the present disclosure.

FIG. 6 is a flow diagram of a method for managing RAID information in accordance with a number of embodiments of the present disclosure. At block 660, the method can include receiving a first signal indicative of data associated with a memory access request from a host by interface management circuitry of a memory controller configured for a non-deterministic memory protocol such as Compute Express Link (CXL) protocol or other types of protocols such as deterministic memory protocols. At block 662, the method can include transmitting a second signal indicative of the data to a first location in a first cache. At block 664, the method can include transmitting a third signal indicative of the data to a second location in a second cache.

In some embodiments, the method can include transmitting the second signal contemporaneous with transmitting the third signal. For instance, in embodiments with a first cache and a separate and distinct second cache, the method can include transmitting separate signals substantially contemporaneously to each of the first cache and the second cache.

In some embodiments, the method can include transmitting a fourth signal indicative of additional data associated with an additional memory request to the first cache to cache the additional data in the first cache. In such embodiments, transmitting the fourth signal can occurs in the absence of transmission of a signal indicative of the additional data to the second cache. In this way, the data (e.g., a copy of the data cached at the first location in the first cache) in the second cache remains unchanged and can be employed, as detailed herein, for performing a RAID operation such as determining updated parity data. For instance, in some embodiments, the method can include receiving a further signal indicative of further data (in addition to data associated with a prior memory access request from the host) associated with a memory access request from the host and responsive to receiving the further signal, transmitting a signal associated with a read operation to read cached data at the second location in the second cache.

For instance, a signal can be transmitted to read cached data at the second location (e.g., in the second cache) responsive to performing or prior to performing a cache eviction. For instance, in some embodiments the method can include performing a cache eviction operation on the first cache, the second cache, or both. For example, the method can include performing a cache eviction operation responsive to receiving a signal indicative of further data associated with a memory access request from the host.

In some embodiments, the method can include transmitting a signal associated with a memory access request to read parity data (e.g., "old" parity data) stored in memory device and performing an operation to determine updated parity data based on the parity data, the cached data from the second location in the second cache and the further data. In some embodiments, the method can include transmitting a signal to store the updated parity data in the memory device and transmitting a signal to store the further data in the memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, by an interface management circuitry of a memory controller including a cache and coupled to a memory device, a first signal indicative of data associated with a memory access request from a host;
   transmitting, by the memory controller, a second signal to cache the data in a first location in the cache;
   transmitting, by the memory controller, a third signal to cache the data in a second location in the cache, wherein the second signal is transmitted substantially contemporaneously with transmitting the third signal, and wherein the data cached in the second location of the cache is an identical copy of the data cached in the first location of the cache;
   receiving a further signal indicative of further data associated with a further memory access request; and
   performing a cache write-back operation in response to receiving the further signal indicative of further data by:
      transmitting a signal associated with a read operation to read cached data at the second location; and
      transmitting a signal to read parity data stored in the memory device.

2. The method of claim 1, wherein the cache is an individual cache, and wherein:
   the first location is associated with a first logical portion of the individual cache; and
   the second location is associated with a second logical portion of the individual cache.

3. The method of claim 1, wherein the cache includes a first cache and a second cache; and wherein:
   the first location is in the first cache; and
   the second location is the second cache.

4. The method of claim 1, further comprising:
   transmitting a fourth signal indicative of additional data associated with an additional memory access request to cache the additional data in the cache in the absence of modification of the data at the second location in the cache.

5. The method of claim 1, further comprising:
   performing an operation to determine updated parity data based on:
      the parity data;
      the cached data read from the second location in the cache; and
      the further data.

6. The method of claim 5, further comprising:
   transmitting a signal to store the updated parity data in the memory device; and
   transmitting a signal to store the further data in the memory device.

7. A method, comprising:
   receiving a first signal indicative of data associated with a memory access request from a host by interface management circuitry of a memory controller configured for a Compute Express Link (CXL) protocol;
   transmitting a second signal indicative of the data to store the data in a first location in a first cache included in the memory controller; and
   transmitting a third signal indicative of the data to store the data in a second location in a second cache included in the memory controller, wherein the second signal is transmitted substantially contemporaneously with transmitting the third signal, and wherein the data cached in the second location is an identical copy of the data cached in the first location;
   receiving a further signal indicative of further data associated with a further memory access request; and
   performing a cache write-back operation in response to receiving the further signal indicative of further data by:
      transmitting a signal associated with a read operation to read cached data at the second location; and
      transmitting a signal to read parity data stored in the memory device.

8. The method of claim 7, further comprising:
   transmitting a fourth signal indicative of additional data associated with the additional memory request to the first cache to cache the additional data in the first cache, and wherein transmitting the fourth signal occurs in the absence of transmission of a signal indicative of the additional data to the second cache.

9. The method of claim 7, further comprising performing a cache eviction operation on the first cache, the second cache, or both, responsive to receiving the further signal.

10. The method of claim 9, further comprising:
    performing an operation to determine updated parity data based on:
       the parity data;
       the cached data from the second location in the second cache; and
       the further data;
    transmitting a signal to store the further data in the memory device; and transmitting a signal to store the updated parity data in the memory device.

11. An apparatus, comprising:
a number of memory devices; and
a memory controller coupled to the number of memory devices, wherein the memory controller includes a cache and is configured to:
  receive a memory access request to access data in the cache; and
  perform one or more memory operations corresponding to the memory access request to access the cache or one or more of the number of memory devices, or both, including performance of memory operations to:
    transmit a second signal indicative of the data to cache the data in a first location in the cache; and
    transmit a third signal indicative of the data to cache the data in a second location in the cache, wherein the second signal is transmitted substantially contemporaneously with transmitting the third signal, and wherein the data cached in the second location of the cache is an identical copy of the data cached in the first location of the cache;
    receive a further signal indicative of further data associated with a further memory access request; and
    perform a cache write-back operation in response to receiving the further signal indicative of further data, wherein the memory controller is further configured to:
      transmit a signal associated with a read operation to read cached data at the second location; and
      transmit a signal to read parity data stored in the memory device.

12. The apparatus of claim 11, wherein the memory controller is further configured to manage the cache in accordance with a write-back cache writing policy.

13. The apparatus of claim 12, wherein the cache further comprises a set-associative cache including a plurality of cache lines.

14. An apparatus, comprising:
a number of memory devices; and
a memory controller coupled to the number of memory devices, wherein the memory controller includes a first cache and a second cache, and wherein the memory controller is configured to:
  receive a memory access request to access data in the first cache, the second cache, or both;
  transmit a second signal indicative of the data to cache the data in a first location in the first cache; and
  transmit a third signal indicative of the data to cache the data in a second location in the second cache, wherein the second signal is transmitted substantially contemporaneously with transmitting the third signal, and wherein the data cached in the second location in the second cache is an identical copy of the data cached in the first location of the first cache;
  receive a further signal indicative of further data associated with a further memory access request; and
  perform a cache write-back operation in response to receiving the further signal indicative of further data, wherein the memory controller is further configured to:
    transmit a signal associated with a read operation to read cached data at the second location; and
    transmit a signal to read parity data stored in the memory device.

15. The apparatus of claim 14, wherein a size of the first cache is the same as a size of the second cache.

16. The apparatus of claim 15, wherein the first location in the first cache has the same physical address as a corresponding physical address of the second location in the second cache.

17. The apparatus of claim 14, wherein the first location in the first cache has the same logical address as a corresponding logical address of the second location in the second cache.

18. A memory controller, comprising:
interface management circuitry configured for a non-deterministic memory protocol; and
data management circuitry coupled to the interface management circuitry, wherein the data management circuitry includes:
  error detection circuitry configured to perform error detection operations on data; and
  error correction circuitry coupled to the error detection circuitry and configured to perform error correction operations on the data; and
  redundant array of independent disks (RAID) circuitry coupled to the error detection circuitry that is configured to perform a recovery operation on the data;
  a first cache;
  a second cache; and
media control circuitry coupled to the data management circuitry; and
a memory interface, configured for a double data rate protocol, coupled to the media control circuitry, wherein the data management circuitry is configured to:
  receive a memory access request to access data in the first cache, the second cache, or both;
  transmit a second signal indicative of the data to cache the data in a first location in the first cache;
  transmit a third signal indicative of the data to cache the data in a second location in the second cache, wherein the second signal is transmitted substantially contemporaneously with transmitting the third signal, and wherein the data cached in the second location in the second cache is an identical copy of the data cached in the first location of the first cache;
  receive a further signal indicative of further data associated with a further memory access request; and
  perform a cache write-back operation in response to receiving the further signal indicative of further data, wherein the data management circuitry is further configured to:
    transmit a signal associated with a read operation to read cached data at the second location; and
    transmit a signal to read parity data stored in the memory device.

19. The memory controller of claim 18, further comprising a first buffer coupled to the first cache, and a second buffer coupled to the second cache, and wherein the data management circuitry is configured to buffer the data in the first buffer and the second buffer.

20. The memory controller of claim 18, wherein the first cache and the second cache are located between encryption circuitry and the RAID circuitry.

* * * * *